United States Patent [19]

Suzuki

[11] Patent Number: 5,095,378
[45] Date of Patent: Mar. 10, 1992

[54] UNIFORM CONTRAST LIQUID CRYSTAL DISPLAY WITH VARIED LIQUID CRYSTAL THICKNESS

[75] Inventor: Shunji Suzuki, Yokohama, Japan

[73] Assignee: International Business Machines Corporation, Armonk, N.Y.

[21] Appl. No.: 559,465

[22] Filed: Jul. 30, 1990

[30] Foreign Application Priority Data

Jul. 28, 1989 [JP] Japan .................. 1-194443

[51] Int. Cl.⁵ .............................................. G02F 1/13
[52] U.S. Cl. ............................................ 359/62; 359/76; 359/87; 359/93
[58] Field of Search ............... 350/336, 339 R, 340, 350/341, 344, 334

[56] References Cited

U.S. PATENT DOCUMENTS

| 4,398,803 | 8/1983 | Pohl et al. ...................... 350/334 |
| 4,521,080 | 6/1985 | Funada et al. .................. 350/341 |
| 4,712,877 | 12/1987 | Okada et al. ............... 350/350 S |

FOREIGN PATENT DOCUMENTS

3741995 6/1989 Fed. Rep. of Germany .
57-169727 10/1982 Japan .
2115424 5/1987 Japan .
2115425 5/1987 Japan .
62-150226 7/1987 Japan .
62-215236 9/1987 Japan .
63-291031 11/1988 Japan .
1-279223 11/1989 Japan .
1-280722 11/1989 Japan .

OTHER PUBLICATIONS

Ludeman et al., "Liquid Crystal Cell Having Nonuniform Thickness", IBM Technical Disclosure Bulletin, vol. 15, No. 4, 9/72, pp. 1349-1350.

*Primary Examiner*—Stanley D. Miller
*Assistant Examiner*—Ron Trice
*Attorney, Agent, or Firm*—Robert M. Trepp

[57] ABSTRACT

A liquid crystal display is described incorporating a front electrode, a rear electrode and a liquid crystal material assembled to provide various optical path differences. The invention overcomes the problem of variation in contrast ratio and black level (background color) as a function of the viewing angle. The surfaces of the liquid crystal form an angle between $5 \times 10^{-5}$ to $5 \times 10^{-4}$ degrees.

7 Claims, 12 Drawing Sheets

UNIFORM CONTRAST LIQUID CRYSTAL DISPLAY WITH VARIED LIQUID CRYSTAL THICKNESS

BACKGROUND OF INVENTION:

1. Field of the Invention

The present invention concerns a liquid crystal display, and relates especially to a normally black twisted nematic liquid crystal display with a nematic liquid crystal material interposed between the front electrode and the rear electrode.

2. Description of the Prior Art

A normally black twisted nematic liquid crystal display is normally composed of a front electrode, which has been subjected to an orientation treatment in an obliquely upward direction (typically, 45° in the upper right direction or in the upper left direction for the given typical example); a rear electrode, which has been subjected to an orientation treatment in an obliquely downward direction (typically, 45° in the lower right direction or in lower left direction for the given typical example); a nematic liquid crystal material laid between the two electrodes to be twist-oriented by 90°, and front and rear polarizing plates provided in front of and behind the front and rear electrodes respectively in a direction coinciding with the orientation of either the front electrode or the rear electrode. Thus when no voltage is applied between the front and rear electrodes, the polarizational direction of light deviates from the polarizational axis of the front polarizing plate by the 90° twist orientation of the liquid crystal material, so that no light can pass ahead of the front polarizing plate; on the other hand, when a voltage not less than a definite threshold value is applied between the front and rear electrodes, the twist of the liquid crystal material is released to pass light.

In such a liquid crystal display, conventionally the optical path length difference, $\Delta nd$, of the liquid crystal material (the product of the thickness of the liquid crystal material between the front and rear electrodes, that is, cell thickness d, and the double-refraction index, $\Delta n$, of the liquid crystal material) is so set that the transmittance with no voltage applied between the electrodes can be minimized when the display panel is viewed in front.

Such a method of setting a $\Delta nd$ enables a contrast ratio observed in front of the display panel to be maximized, yet on the other hand involves some problems, e.g.: the black level (background color) and the contrast ratio vary with visual angles; this method necessitates thinning the cell thickness and therefore the contrast and chromaticity might vary even with a slight manufacture error in cell thickness.

In order to solve these problems, the inventor proposed in Japanese Patent Application No. 63-283760 that the variations in contrast and black level (background color) with visual angle changing be reduced by limiting the optical path length difference to not smaller than 1.4 µm and not longer than 1.7 µm.

Even though the technique disclosed in the above-mentioned Patent Application No. 63-283760 may be employed, there still remains the problem that in vertically long liquid crystal displays, changes in contrast and black level (background color) tend to increase as the visual angle is changed upward or downward, since in the vertically long liquid crystal displays it is natural that their visual angles increase in the vertical direction.

The present invention is intended to solve the above-mentioned problem and to provide a liquid crystal display in which, when the upward or downward visual angle is varied, the variation in contrast ratio and black level (background color) is small, and, moreover, a sufficient contrast ratio can be obtained.

SUMMARY OF THE INVENTION

In accordance with the present invention, an apparatus and method is described for reducing the variation in contrast ratio of a liquid crystal display as a function of the visual angle to the liquid crystal display comprising the steps of setting the optical path length difference at a relatively small value in the upper positions of the liquid crystal display, and setting the optical path length difference at a relatively large value in the lower positions of the liquid crystal display, wherein the optical path length difference is given as the product of the thickness of a liquid crystal material interposed between a front electrode and a rear electrode and the double-refraction index of the liquid crystal material.

Concretely speaking, any liquid crystal display (LCD) in accordance with the present invention meet the following requirements with respect to the optical path length difference, U, given as the product of the thickness of a liquid crystal material interposed between the front electrode and the rear electrode in the first vertical position and the double-refraction index of said liquid crystal material, and the optical path length difference, D, given as the product of the thickness of a liquid crystal material interposed between the front electrode and the rear electrode in the second position below the above first position and the double-refraction index of the liquid crystal material:

$$0.5 \ \mu m \leq U \leq 0.6 \ \mu m$$

$$0.5 \ \mu m \leq D \leq 0.6 \ \mu m$$

$$D < U.$$

Theoretically, the optical path length difference of the liquid crystal material between the front electrode and the rear electrode can be changed by varying the thickness of the liquid crystal material through varying the space between the front electrode and the rear electrode, or by varying the double-refraction index of the liquid crystal material. However, because it is difficult in manufacturing to inject different liquid crystal materials in different positions respectively along the vertical direction and to seal, it is preferable to change the optical path length difference by varying the space between the front electrode and the rear electrode.

To widen the space between the front electrode and the rear electrode in the above first position and to narrow it in the second position, we have only to thin in the first position and thicken in the second position at least at one of the front and rear electrodes, or to tilt the front electrode relatively to the rear electrode.

It is preferable that the gradient of the front electrode to the rear electrode is within the range $5.0 \times 10^{-5}$ to $5.0 \times 10^{-4}$ degrees.

An object of the invention is to provide a liquid crystal display which has a small change in contrast ratio and a black level (i.e. background color) when a view point is changed in the upper and lower direction. The invention can be applied to a liquid crystal display where a nematic liquid crystal material is disposed between two plates, the plates are oriented (for example rubbed) to cause the liquid crystal material to define a twisted structure in the direction perpendicular to the plates, and the direction of the orientation of the plates is selected so that the normal direction viewing is identical with the direction in which the twisted structure is lost when a voltage is applied across the liquid crystal material.

In accordance with the invention, when the direction of viewing is the lower direction, an optical path difference between the plates in the upper area of the liquid crystal display is larger than an optical path difference between the plates in the lower area of the liquid crystal display. When the direction of viewing is the upper direction, an optical path difference between the plates in the upper area of the liquid crystal display is smaller than an optical path difference between the plates in the lower area of the liquid crystal display. The optical path difference means the product of an index of birefringence (delta n) and thickness the liquid crystal material between the plates.

In accordance with present invention, the variations in the contrast ratios and black levels (background colors) of LCDs can be reduced. Further, sufficient contrast ratios can be obtained.

DESCRIPTION OF THE PREFERRED EMBODIMENTS

Figure 1:
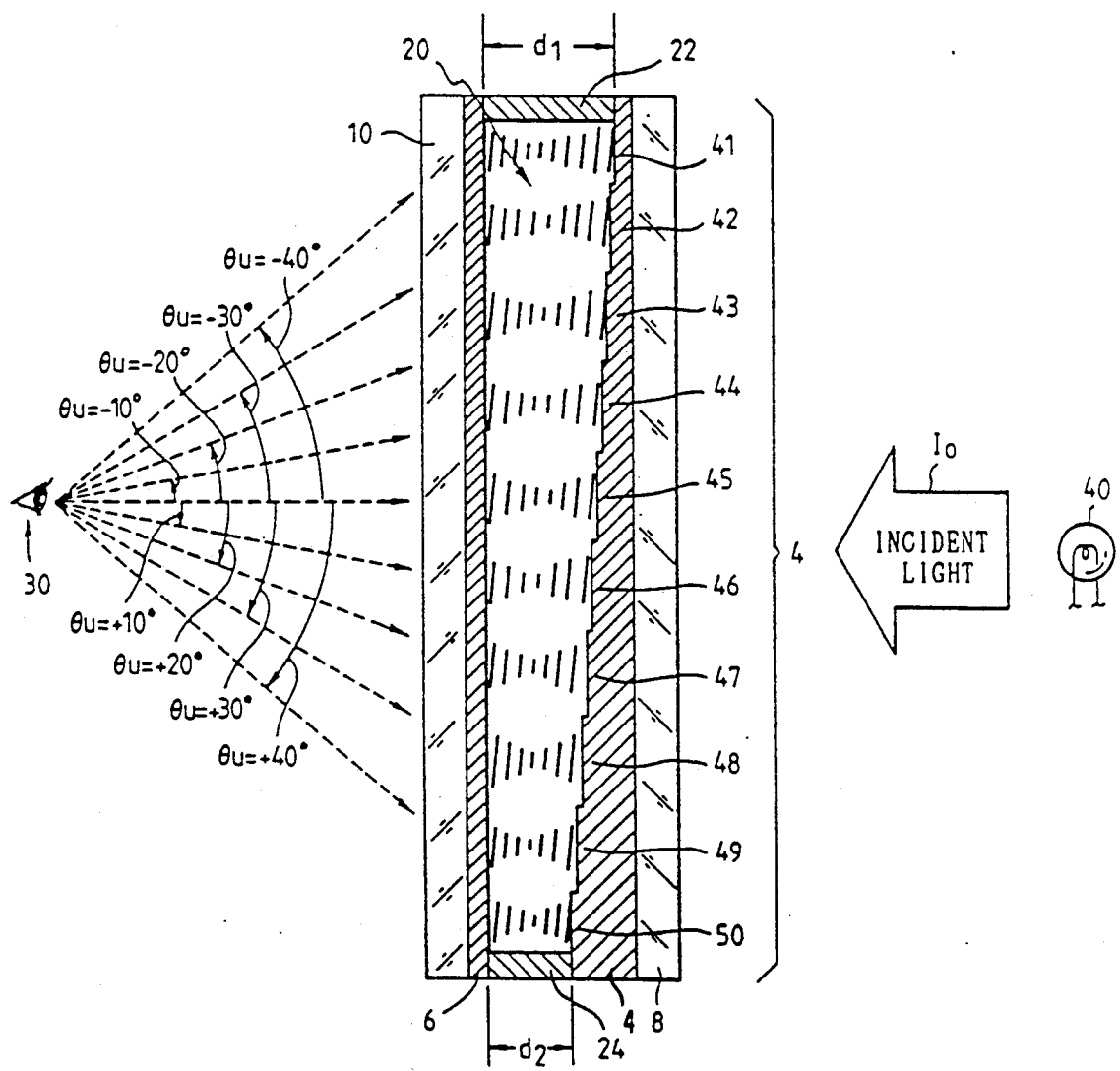
FIG. 1 is a sectional view of an embodiment of a normally black twisted nematic liquid crystal display in accordance with the present invention.
Figure 2:
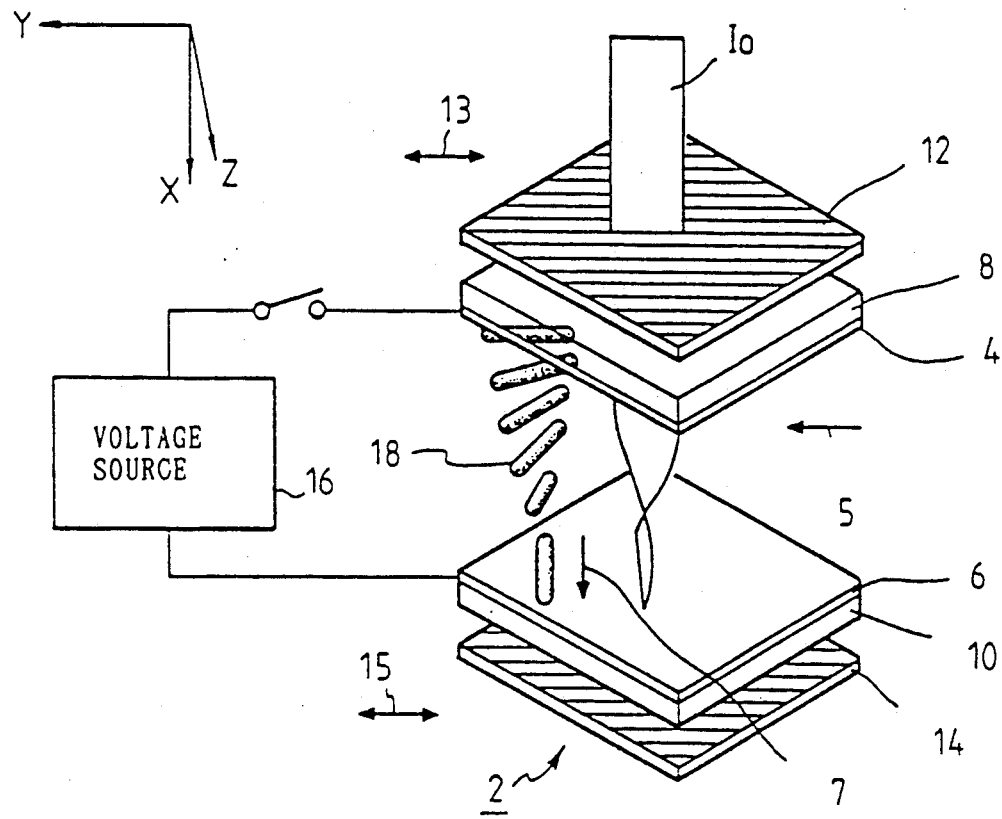
FIG. 2 is an exploded perspective view of a normally black liquid crystal display with no voltage applied.
Figure 3:
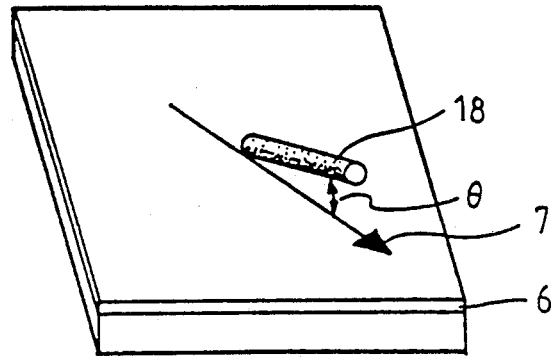
FIG. 3 is an explanatory drawing of the pretilt of a longitudinal liquid crystal molecular axis.

Referring now to FIGS. 2 and 3, a typical normally black twisted nematic liquid crystal display will be described to which an embodiment of the present invention shown in FIG. 1 can be applied. In FIG. 2, a transparent type twisted nematic liquid crystal display 2 has a liquid crystal material with a positive dielectric anisotropy between a transparent rear glass substrate 8 and a front glass substrate 10 inside of which there are respectively a transparent rear electrode 4 and a transparent front electrode 6. Behind the rear glass substrate 8 there is a rear linear polarizing plate 12, and in front of the front glass substrate 10 there is a front linear polarizing plate 14. The surface to the liquid crystal material side of the rear electrode 4 is subjected to an orientation treatment, e.g., rubbing, in the direction directed with an arrow 5, or in the Y-axial direction. The surface to the liquid crystal material side of the front electrode 6 is subjected to an orientation treatment, e.g., rubbing, in the direction directed with an arrow 7, or in the Z-axial direction, or perpendicularly to the Y axis. When no voltage is applied between the rear electrode 4 and the front electrode 6 from the voltage source 16, the liquid crystal molecular major axes 18 are aligned in the Y-axial direction on the interface with the rear electrode 4, and in the Z-axial direction on the interface with the front electrode 6. Accordingly, the molecules of the liquid crystal material are oriented in a helical shape uniformly twisted by 90 degrees between the rear electrode 4 and the front electrode 6. The polarizational axes 13 and 15 of the rear linear polarizing plate 12 and the front linear polarizing plate 14 are both in the same Y-axial direction, or in the orientation treatment direction of the rear electrode 4.

On the boundary surface between the front electrode 6 and the liquid crystal material, as shown in FIG. 3, the liquid crystal molecular axis 18 is so tilted that the distance from the front electrode 6 increase as the axis 18 extends along the orientation direction 7, or in the direction 19 from the bottom toward the top of the liquid crystal display panel. The angle θ formed between the major axis 18 and the orientation 7 is called a pretilt angle. Likewise, on the boundary surface between the rear electrode 4 and the liquid crystal material, the liquid crystal molecular axis 18 is so pretilted that the distance from the rear electrode 4 decrease as the axis 18 extends along the orientation direction 5, or in the direction 19 from the bottom toward the top of the liquid display panel.

Figure 5:
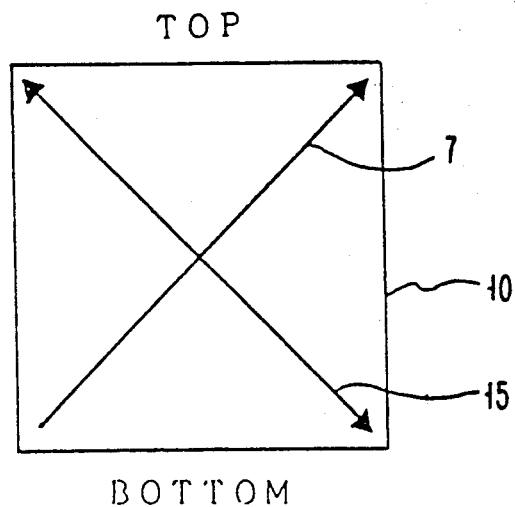
FIG. 5 is an explanatory drawing of the relations between the polarizational axes and their orientations on the front glass substrate side of the liquid crystal display shown in FIGS. 1, 2, and 3.

FIG. 5 shows the relation between the orientation direction 7 of the front electrode 6 provided on the liquid crystal material side of the front glass substrate 10 and the polarizational axis 15 of the polarizing plate 14 provided on the front side of the front glass substrate 10, or on the observer side of the display. The orientation direction 7 is at an upper-rightward angle of 45 degrees to the horizontal line, whereas the polarizational axis 15 is at an upper-leftward angle of 45 degrees, or a lower-rightward angle of 45 degrees, to the horizontal line, thus the orientation direction 7 intersecting orthogonally with the polarizational axis 15.

Figure 6:
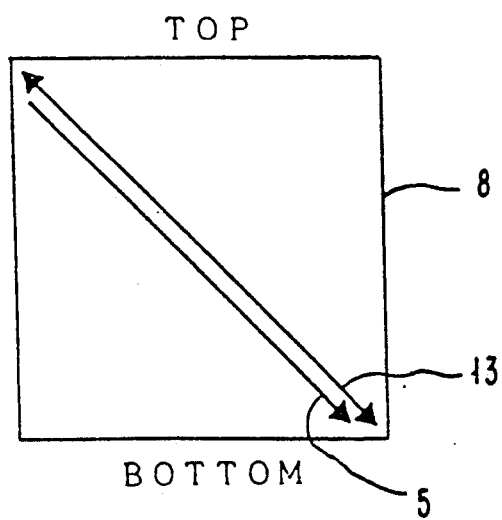
FIG. 6 is an explanatory drawing of the relations between the polarizational axes and their orientations on the rear glass substrate side of the liquid crystal display shown in FIGS. 1, 2, and 4.

FIG. 6 shows the relation between the orientation direction 5 of the rear electrode 4 provided on the liquid crystal material side of the rear glass substrate 8 and the polarizational axis 13 of the polarizing plate 12 provided behind the rear glass substrate 8, or on the back-light (40 in FIG. 1) side. The orientation direction 5 is at a lower-rightward angle of 45 degrees to the horizontal line, whereas the polarizational axis 13 is parallel with the orientation direction 5.

When no voltage is applied between the electrodes 4 and 6 from the voltage source 16, an incident light Io, whose plane of polarization is aligned to the polarizational direction of the linear polarizing plate 12, reaches the linear polarizing plate 14 after the plane of polarization is rotated by an angle corresponding to the torsional orientation of the liquid crystal molecules when Io passes the liquid crystal material between the electrode 4 and the electrode 6, as shown in FIG. 2. Since the polarization plane of the incident light forms an angle of 90 degrees to the plane of polarization of the linear polarizing plate 14, the incident light fails to pass the linear polarizing plate 14 and therefore reveals a "dark state" to an observer who is positioned under the linear polarizing plate 14.

Figure 4:
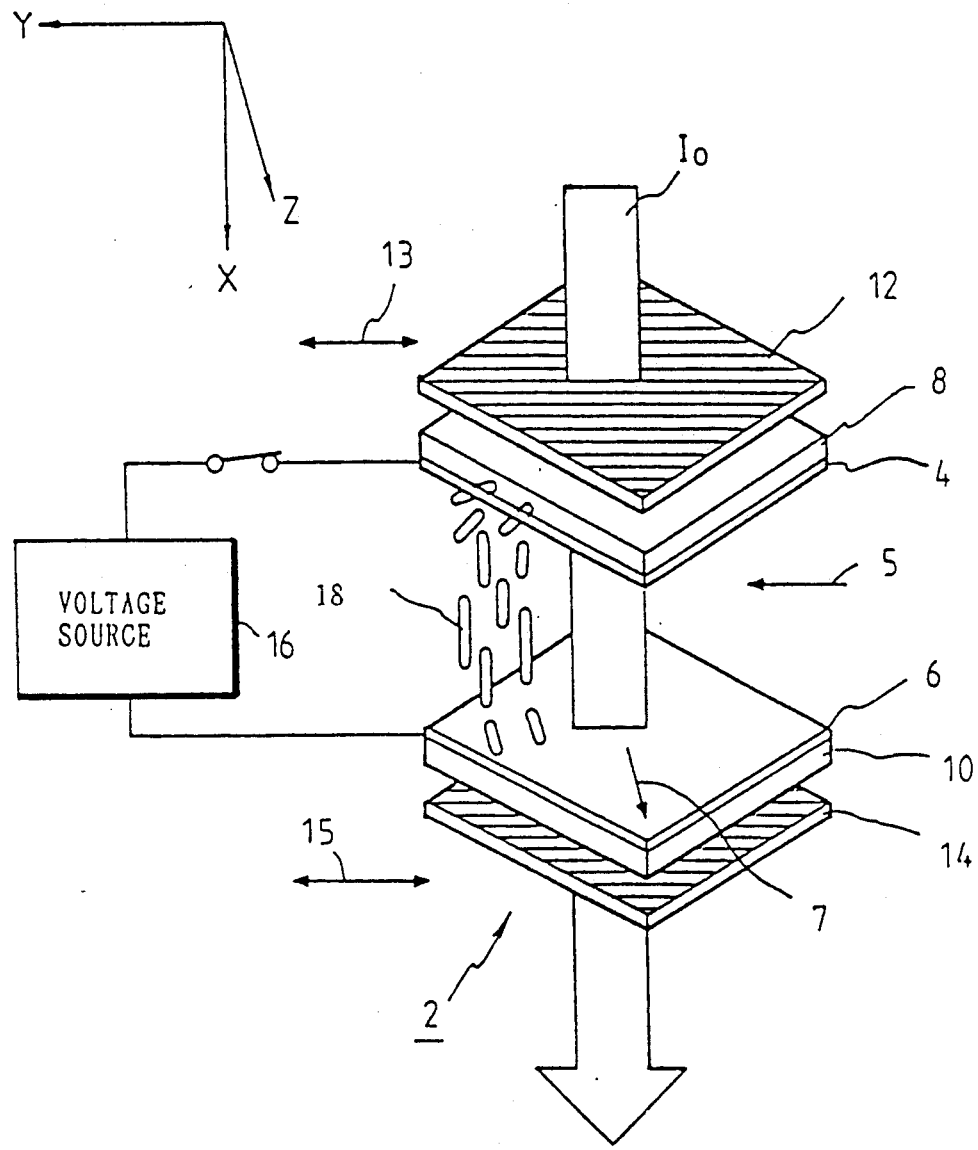
FIG. 4 is an exploded perspective view of the normally black liquid crystal display with a voltage applied.

When a voltage is applied between the electrodes 4 and 6 from the voltage source 16, as shown in FIG. 4, the liquid crystal molecular axes are orientated in almost parallel with the electric field induced between the electrodes 4 and 6 by the voltage applied, though the liquid crystal molecular axis 18 still retains a certain pretilt shown in FIG. 3. Since in this situation, the incident light Io reaches the linear polarizing plate 14 without the plane of polarization being rotated, the plane of polarization of the incident light Io coincides with that of the linear polarizing plate 14, thus the incident light Io succeeds to pass the linear polarizing plate 14, revealing a "bright state" to an observer who is positioned under the linear polarizing plate 14.

FIG. 1 shows an embodiment of a normally black twisted nematic liquid crystal display in accordance with the present invention. A twisted nematic (TN) liquid crystal material 20 (e.g., Merk-made ZLI3651) mixed with a 0.1 percent-by-weight mixture of counterclockwise chiral agent (e.g., BDH-made C-15) has been injected in between the front electrode 6 on the front glass substrate 10 positioned on the observer 30 side and the rear electrode 4 on the rear glass substrate 8 positioned on the back-light 40 side. The front electrode 6 and the rear electrode 4 are composed of an indium-tin oxide (ITO). The rear electrode 4 consists of a plurality of subelectrodes, i.e., a 1.0-μm-thick subelectrode 41, a 1.15-μm-thick subelectrode 42, a 1.3-μm-thick subelectrode 43, a 1.4-μm-thick subelectrode 44, a 1.5-μm-thick subelectrode 45, a 1.6-μm-thick subelectrode 46, a 1.7-μm-thick subelectrode 47, a 1.8-μm-thick subelectrode 48, a 1.9-μm-thick subelectrode 49, and a 2.0-μm-thick subelectrode 50. It is preferable that the electrodes 4 and 6 are formed by vacuum deposition process. However, they may be formed by the sputtering process.

The rear electrode 4 thus gradually thickens downward and accordingly the space between the front electrode 6 and the rear electrode 4, or the thickness of the TN liquid crystal material 20 between both electrodes, gradually decreases downward, thus: 6.0 μm in the space between the front electrode 6 and the rear subelectrode 41; 5.85 μm in the space between the front electrode 6 and the rear subelectrode 42; 5.7 μm in the space between the front electrode 6 and the rear subelectrode 43; 5.6 μm in the space between the front electrode 6 and the rear subelectrode 44; 5.5 μm in the space between the front electrode 6 and the rear subelectrode 45; 5.4 μm in the space between the front electrode 6 and the rear subelectrode 46; 5.3 μm in the space between the front electrode 6 and the rear subelectrode 47; 5.2 μm in the space between the front electrode 6 and the rear subelectrode 48; 5.1 μm in the space between the front electrode 6 and the rear subelectrode 49; and 5.0 μm in the space between the front electrode 6 and the rear subelectrode 50.

Accordingly, the optical path length difference, or the product of the thickness of the TN liquid crystal material 20 between the front electrode 6 and the rear electrode 4 and the double-refraction index of the TN liquid crystal material 20 is as follows: 0.6 μm between the front electrode 6 and the rear subelectrode 41; 0.585 μm between the front electrode 6 and the rear subelectrode 42; 0.57 μm between the front electrode 6 and the rear subelectrode 43; 0.56 μm between the front electrode 6 and the rear subelectrode 44; 0.55 μm between the front electrode 6 and the rear subelectrode 45; 0.54 μm between the front electrode 6 and the rear subelectrode 46; 0.53 μm between the front electrode 6 and the rear subelectrode 47; 0.52 μm between the front electrode 6 and the rear subelectrode 48; 0.51 μm between the front electrode 6 and the rear subelectrode 49; and 0.50 μm between the front electrode 6 and the rear subelectrode 50.

In order to seal the liquid crystal material 20 between the front electrode 6 and the rear electrode 4, seals of a certain sealing material as a mixture of a mono-liquid epoxy adhesive and glass fiber are formed on the edges of the front glass substrate 10 and the rear glass substrate 8 by screen printing. Of such seals, the upper seal 22 at each of the upper ends of the front glass substrate 10 and the rear glass substrate 8 has a width $d_1$ of 6.0 μm, whereas the lower seal 24 at each of the lower ends of the front glass substrate 10 and the rear glass substrate 8 has a width $d_2$ of 5.0 μm. Also, there is a side seal (not illustrated) between the upper seal 22 and the lower seal 24.

Table 1 lists the dependence on visual angle of the contrast ratios and chromaticity of the liquid crystal display shown in FIG. 1 which is the embodiment of the present invention.

TABLE 1

| Δnd = 0.60 | Δnd = 0.585 | Δnd = 0.57 | Δnd = 0.56 | Δnd = 0.55 | Δnd = 0.54 | Δnd = 0.53 | Δnd = 0.52 | Δnd = 0.51 | |
|---|---|---|---|---|---|---|---|---|---|
| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
| 9.0 | 14.5 | 24.3 | 31.9 | 40.1 | 36.2 | 44.2 | 30.8 | 17.7 | Contrast ratio |

TABLE 1-continued

| Δnd = 0.60 | Δnd = 0.585 | Δnd = 0.57 | Δnd = 0.56 | Δnd = 0.55 | Δnd = 0.54 | Δnd = 0.53 | Δnd = 0.52 | Δnd = 0.51 | |
| --- | --- | --- | --- | --- | --- | --- | --- | --- | --- |
| .288,.388 | .191,.330 | .137,.250 | .124,.206 | .128,.184 | .116,.199 | .174,.178 | .177,.224 | .167,.304 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 30.7 | 39.4 | 43.0 | 39.0 | | 37.6 | 42.1 | 30.8 | 13.1 | Contrast ratio |
| .159,.158 | .149,.158 | .128,.167 | .119,.190 | | .119,.192 | .217,.160 | .278,.187 | .359,.266 | Chromaticity: x, y |

The contrast ratios and chromaticity listed in Table 1 have been determined on the following assumptions, as shown in FIG. 1: the position of the rear subelectrode 41, or the position at which the optical path length difference is 0.6 μm, is looked up at an angle of 40 degrees, or at a visual angle θu of −40 degrees, from below by an observer 30; the position of the rear subelectrode 42, or the position at which the optical path length difference is 0.585 μm, is looked up at an angle of 30 degrees, or at a visual angle θu of −30 degrees, from below by the observer 30; the position of the rear subelectrode 43, or the position at which the optical path length difference is 0.57 μm, is looked up at an angle of 20 degrees, or at a visual angle θu of −20 degrees, from below by the observer 30; the position of the rear subelectrode 44, or the position at which the optical path length difference is 0.56 μm, is looked up at an angle of 10 degrees, or at a visual angle θu of −10 degrees, from below by the observer 30; the position of the rear subelectrode 45, or the position at which the optical path length difference is 0.55 μm, is looked horizontally, or at a visual angle θu of 0 degree, by the observer 30; the position of the rear subelectrode 46, or the position at which the optical path length difference is 0.54 μm, is looked down at an angle of 10 degrees, or at a visual angle θu of +10 degrees, from above by the observer 30; the position of the rear subelectrode 47, or the position at which the optical path length difference is 0.53 μm, is looked down at an angle of 20 degrees, or at a visual angle θu of +20 degrees, from above by the observer 30; the position of the rear subelectrode 48, or the position at which the optical path length difference is 0.52 μm, is looked down at an angle of 30 degrees, or at a visual angle θu of +30 degrees, from above by the observer 30; and the position of the rear subelectrode 49, or the position at which the optical path length difference is 0.51 μm, is looked down at an angle of 40 degrees, or at a visual angle θu of +40 degrees, from above by the observer 30.

Figure 7:
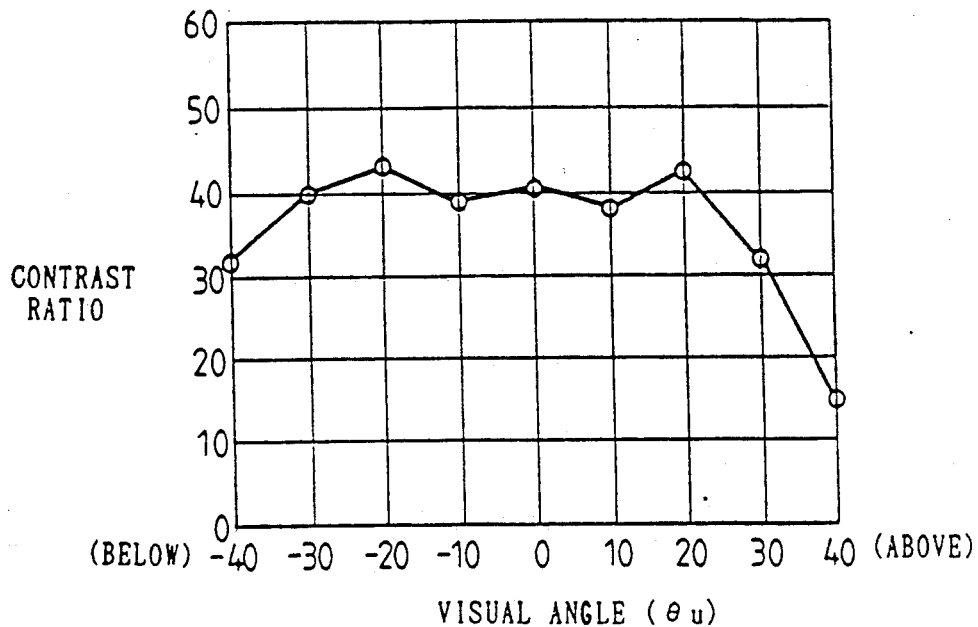
FIG. 7 is a graphic representation of the vertical visual angular dependence of the contrast ratio of the liquid crystal display shown in FIG. 1.

FIG. 7 is a graphic representation of the contrast ratios listed in Table 1. As seen from this figure, the embodiment of the liquid crystal display in accordance with the present invention shown in FIG. 1 will give contrast ratios of not less than 30:1 with a slight deviation in contrast ratio around 40:1 even if the visual angle θu varies between −40 degrees and +30 degrees.

The inventor made some LCD prototypes which use a TN liquid crystal material (Merk-made ZLI3651) mixed with a counterclockwise chiral agent with a double-refraction index Δn of 0.1 and whose cell thickness of the liquid crystal material 20 interposed between the front electrode 6 and the rear electrode 4 (i.e. cell thickness) are respectively 4.9, 5.0, 5.1, 5.2, 5.3, 5.4, 5.5, 5.6, 5.7, 5.85, 6.0, 6.1, and 6.2 μm, and made a comparative analysis of them. The surfaces of the rear electrode 4 and front electrode 6 which are in contact with the liquid crystal material were subjected to a rubbing process in the Y-axial direction (orientation 5) and the Z-axial direction (orientation 7). The back-light 40 of the transparent liquid crystal display 2 is a 3-wavelength type fluorescent light, with which there are peaks near 435 nm, 545 nm, and 610 nm in wavelength and whose color temperature is about 6000° K. The polarizing plates 12 and 14 are neutral grey in color, about 40% in transmittance, and at least 99% in the degree of polarization. The chromaticity (black level color) of the screen with no voltage applied and the transmittance-voltage characteristics with a voltage (5-V rectangular wave; 30 Hz) applied were measured to determine contrast ratios.

Table 2 lists variations in contrast ratio and chromaticity when an LCD with a cell thickness of 4.9 μm and a Δnd of 0.49 μm is observed from different visual angles.

TABLE 2

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
| --- | --- | --- | --- | --- | --- | --- | --- | --- | --- |
| 46.1 | 52.2 | 34.7 | 25.8 | 22.3 | 26.1 | 35.1 | 51.7 | 42.5 | Contrast ratio |
| .221,.198 | .289,.199 | .382,.252 | .428,.290 | .428,.300 | .423,.286 | .374,.243 | .282,.190 | .222,.192 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 4.9 | 8.4 | 13.8 | 20.7 | | 19.7 | 40.6 | 58.2 | 2.7 | Contrast ratio |
| .513,.402 | .523,.389 | .495,.362 | .458,.321 | | .439,.304 | .466,.335 | .491,.372 | .498,.404 | Chromaticity: x, y |

Table 3 lists variations in contrast ratio and chromaticity when an LCD with a cell thickness of 5.0 μm and a Δnd of 0.50 μm is observed from different visual angles.

TABLE 3

| 40°, leftward | 30°, leftward | 20°, leftward | 10°, leftward | 0° | 10°, rightward | 20°, rightward | 30°, rightward | 40°, rightward |
| --- | --- | --- | --- | --- | --- | --- | --- | --- |

TABLE 3-continued

| (L) | (L) | (L) | (L) |  | (R) | (R) | (R) | (R) | |
|---|---|---|---|---|---|---|---|---|---|
| 22.4 | 44.3 | 57.0 | 51.8 | 45.5 | 50.9 | 55.3 | 42.7 | 24.2 | Contrast ratio |
| .193,.239 | .172,.182 | .199,.165 | .242,.180 | .261,.200 | .240,.186 | .201,.172 | .178,.199 | .123,.278 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 9.2 | 20.1 | 35.2 | 45.7 |  | 42.0 | 31.1 | 17.0 | 9.8 | Contrast ratio |
| .447,.422 | .419,.362 | .350,.280 | .292,.224 |  | .269,.201 | .309,.228 | .363,.282 | .412,.340 | Chromaticity: x, y |

Table 4 lists variations in contrast ratio and chromaticity when an LCD with a cell thickness of 5.1 μm and a Δnd of 0.51 μm is observed from different visual angles.

Table 6 lists variations in contrast ratio and chromaticity when an LCD with a cell thickness of 5.3 μm and a Δnd of 0.53 μm is observed from different visual angles.

TABLE 4

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 16.0 | 30.6 | 46.0 | 52.1 | 46.9 | 51.2 | 46.5 | 31.1 | 17.7 | Contrast ratio |
| .172,.278 | .125,.218 | .117,.178 | .133,.168 | .146,.182 | .136,.172 | .120,.183 | .127,.232 | .167,.304 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 11.8 | 26.7 | 43.4 | 49.6 |  | 49.5 | 41.5 | 24.4 | 13.1 | Contrast ratio |
| .417,.364 | .360,.280 | .275,.203 | .224,.177 |  | .208,.165 | .235,.170 | .297,.205 | .359,.266 | Chromaticity: x, y |

TABLE 6

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 16.0 | 30.3 | 45.1 | 50.6 | 46.9 | 50.3 | 44.2 | 29.3 | 16.4 | Contrast ratio |
| .212,.277 | .178,.214 | .174,.169 | .191,.158 | .204,.166 | .193,.160 | .174,.178 | .180,.232 | .214,.310 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 15.9 | 31.9 | 46.2 | 48.6 |  | 48.7 | 42.1 | 25.1 | 13.3 | Contrast ratio |
| .413,.352 | .353,.268 | .268,.195 | .219,.173 |  | .201,.165 | .217,.160 | .267,.181 | .325,.228 | Chromaticity: x, y |

Table 5 lists variations in contrast ratio and chromaticity when an LCD with a cell thickness of 5.2 μm and a Δnd of 0.52 μm is observed from different visual angles.

Table 7 lists variations in contrast ratio and chromaticity when an LCD with a cell thickness of 5.4 μm and a Δnd of 0.54 μm is observed from different visual angles.

TABLE 5

| 40°, leftward (L) | 30°, leftward (L) | 20°, leftward (L) | 10°, leftward (L) |  | 10°, rightward (R) | 20°, rightward (R) | 30°, rightward (R) | 40°, rightward (R) | |
|---|---|---|---|---|---|---|---|---|---|
| 16.5 | 31.7 | 47.6 | 52.5 | 48.5 | 53.2 | 45.9 | 30.8 | 16.7 | Contrast ratio |
| .207,.269 | .173,.207 | .175,.166 | .196,.156 | .210,.166 | .196,.155 | .176,.175 | .177,.224 | .208,.303 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 14.9 | 35.0 | 45.1 | 50.8 |  | 50.8 | 40.2 | 30.8 | 12.3 | Contrast ratio |
| .423,.366 | .366,.283 | .280,.203 | .225,.170 |  | .205,.162 | .227,.162 | .278,.187 | .340,.242 | Chromaticity: x, y |

TABLE 7

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 11.7 | 19.1 | 28.7 | 35.2 | 34.7 | 36.2 | 27.5 | 19.3 | 12.5 | Contrast ratio |

TABLE 7-continued

| .207,.334 | .163,.288 | .124,.232 | .119,.200 | .131,.201 | .116,.199 | .132,.244 | .168,.302 | .216,.369 | Chromaticity: x, y |
|---|---|---|---|---|---|---|---|---|---|
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 25.0 .317,.242 | 42.8 .185,.184 | 49.1 .129,.167 | 41.0 .119,.190 | | 37.6 .119,.192 | 42.0 .119,.164 | 35.5 .145,.154 | 19.7 .205,.174 | Contrast ratio Chromaticity: x, y |

Table 8 lists variations in contrast ratio and chromaticity when an LCD with a cell thickness of 5.5 μm and a Δnd of 0.55 μm is observed from different visual angles.

Table 10 lists variations in contrast ratio and chromaticity when an LCD with a cell thickness of 5.7 μm and a Δnd of 0.57 μm is observed from different visual angles.

TABLE 8

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 13.9 .192,.312 | 23.6 .141,.258 | 34.7 .115,.206 | 40.8 .120,.181 | 40.1 .128,.184 | 40.5 .115,.187 | 33.8 .117,.215 | 27.7 .147,.279 | 14.4 .192,.348 | Contrast ratio Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 19.3 .341,.261 | 35.2 .270,.192 | 47.3 .153,.172 | 46.2 .121,.179 | | 41.9 .121,.178 | 40.2 .129,.162 | 28.9 .172,.163 | 12.7 .244,.198 | Contrast ratio Chromaticity: x, y |

TABLE 10

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 10.9 .250,.338 | 17.1 .175,.304 | 24.3 .137,.250 | 28.6 .129,.217 | 28.1 .135,.219 | 29.1 .129,.219 | 23.1 .181,.252 | 17.0 .178,.326 | 11.7 .225,.389 | Contrast ratio Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 26.6 .247,.208 | 41.2 .172,.163 | 43.0 .128,.167 | 37.5 .119,.191 | | 31.1 .125,.207 | 32.1 .121,.179 | 29.5 .138,.149 | 18.2 .179,.144 | Contrast ratio Chromaticity: x, y |

Table 9 lists variations in contrast ratio and chromaticity when an LCD with a cell thickness of 5.6 μm and a Δnd of 0.56 μm is observed from different visual angles.

Table 11 lists variations in contrast ratio and chromaticity when an LCD with a cell thickness of 5.85 m and a Δnd of 0.585 μm is observed from different visual angles.

TABLE 9

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 11.2 .254,.342 | 18.3 .186,.283 | 26.1 .135,.242 | 31.9 .124,.206 | 32.2 .126,.203 | 32.0 .123,.207 | 26.4 .133,.247 | 18.6 .168,.313 | 12.3 .255,.373 | Contrast ratio Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 26.6 .260,.224 | 43.5 .174,.168 | 47.3 .122,.166 | 39.0 .119,.190 | | 33.6 .121,.200 | 35.7 .122,.172 | 32.1 .139,.146 | 18.0 .194,.155 | Contrast ratio Chromaticity: x, y |

TABLE 11

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 9.2 .243,.368 | 14.5 .191,.330 | 19.6 .155,.278 | 23.4 .139,.241 | 23.4 .137,.242 | 23.3 .137,.244 | 19.5 .153,.286 | 14.4 .229,.335 | 10.0 .271,.397 | Contrast ratio Chromaticity: x, y |

TABLE 11-continued

| 40°, downward (D) | 30°, downward (D) | 20°, downward (D) | 10°, downward (D) | 0° | 10°, upward (U) | 20°, upward (U) | 30°, upward (U) | 40°, upward (U) | |
|---|---|---|---|---|---|---|---|---|---|
| 28.8 | 39.4 | 36.9 | 28.7 | | 25.4 | 26.2 | 25.9 | 18.5 | Contrast ratio |
| .212,.183 | .149,.158 | .121,.185 | .127,.223 | | .133,.230 | .127,.202 | .131,.162 | .156,.243 | Chromaticity: x, y |

Table 12 lists variations in contrast ratio and chromaticity when an LCD with a cell thickness of 6.0 μm and a Δnd of 0.60 μm is observed from different visual angles.

visual angle characteristics are rather inferior as evident from the fact that it is up to −20 degrees in visual angle θu, or when the LCD panel is viewed from below at an angle of 20 degrees, that contrast ratios not less than

TABLE 12

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 9.0 | 12.8 | 15.7 | 17.5 | 17.7 | 17.2 | 15.2 | 12.3 | 9.5 | Contrast ratio |
| .288,.388 | .211,.388 | .214,.308 | .195,.272 | .194,.267 | .196,.278 | .215,.319 | .254,.375 | .298,.426 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 30.7 | 31.4 | 26.3 | 21.5 | | 19.3 | 19.2 | 17.9 | 12.4 | Contrast ratio |
| .159,.158 | .130,.172 | .128,.215 | .143,.258 | | .150,.267 | .138,.235 | .128,.188 | .144,.155 | Chromaticity: x, y |

Table 13 lists variations in contrast ratio and chromaticity when an LCD with a cell thickness of 6.1 μm and a Δnd of 0.61 μm is observed from different visual angles.

30:1 are obtained.

Figure 9:
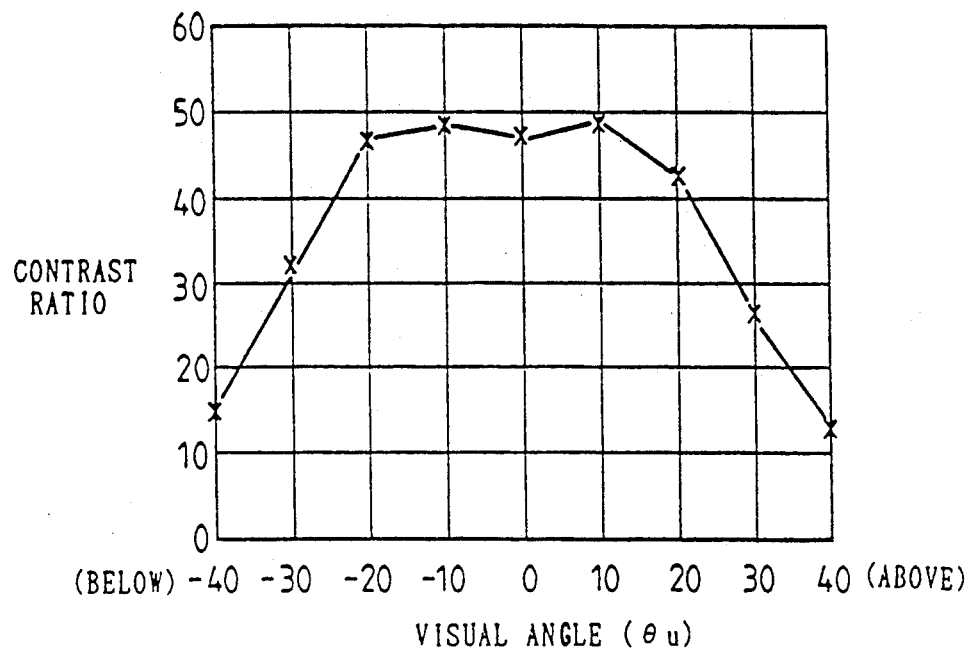
FIG. 9 is a graphic representation of the vertical visual angular dependence of the contrast ratio of said liquid crystal display with its Δnd set at a constant of 0.53.

FIG. 9 shows the dependence on vertical visual angles of the contrast ratios of the LCD with a Δnd of 0.53 listed in Table 6. As apparent from this figure, where

TABLE 13

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 17.2 | 13.6 | 11.3 | 10.2 | 13.8 | 13.9 | 12.3 | 10.0 | 8.3 | Contrast ratio |
| .275,.404 | .232,.374 | .193,.332 | .176,.298 | .173,.290 | .174,.304 | .192,.338 | .232,.396 | .278,.439 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 26.1 | 26.6 | 21.2 | 16.6 | | 11.3 | 8.5 | 7.1 | 5.3 | Contrast ratio |
| .161,.157 | .130,.177 | .142,.222 | .160,.264 | | .169,.275 | .154,.243 | .152,.201 | .174,.156 | Chromaticity: x, y |

Table 14 lists variations in contrast ratio and chromaticity when an LCD with a cell thickness of 6.2 μm and a Δnd of 0.62 μm is observed from different visual angles.

Δnd=0.53, contrast ratios not less than 40:1 are obtained with respect to visual angle θu up to −20 degrees, but the contrast ratio decreases to much less than 40:1 as the visual angle θu reaches −30 degrees, with

TABLE 14

| 40°, leftward (L) | 30°, leftward (L) | 20°, leftward (L) | 10°, leftward (L) | 0° | 10°, rightward (R) | 20°, rightward (R) | 30°, rightward (R) | 40°, rightward (R) | |
|---|---|---|---|---|---|---|---|---|---|
| 7.1 | 9.4 | 11.5 | 13.6 | 13.3 | 13.2 | 11.4 | 9.6 | 8.0 | Contrast ratio |
| .307,.402 | .271,.376 | .234,.331 | .213,.296 | .206,.293 | .214,.300 | .234,.339 | .271,.394 | .312,.435 | Chromaticity: x, y |
| 40°, downward (D) | 30°, downward (D) | 20°, downward (D) | 10°, downward (D) | 0° | 10°, upward (U) | 20°, upward (U) | 30°, upward (U) | 40°, upward (U) | |
| 26.0 | 25.1 | 19.5 | 15.5 | | 12.4 | 8.6 | 6.8 | 2.7 | Contrast ratio |
| .188,.149 | .168,.176 | .181,.225 | .197,.265 | | .204,.273 | .190,.242 | .176,.196 | .175,.155 | Chormaticity: x, y |

Figure 8:
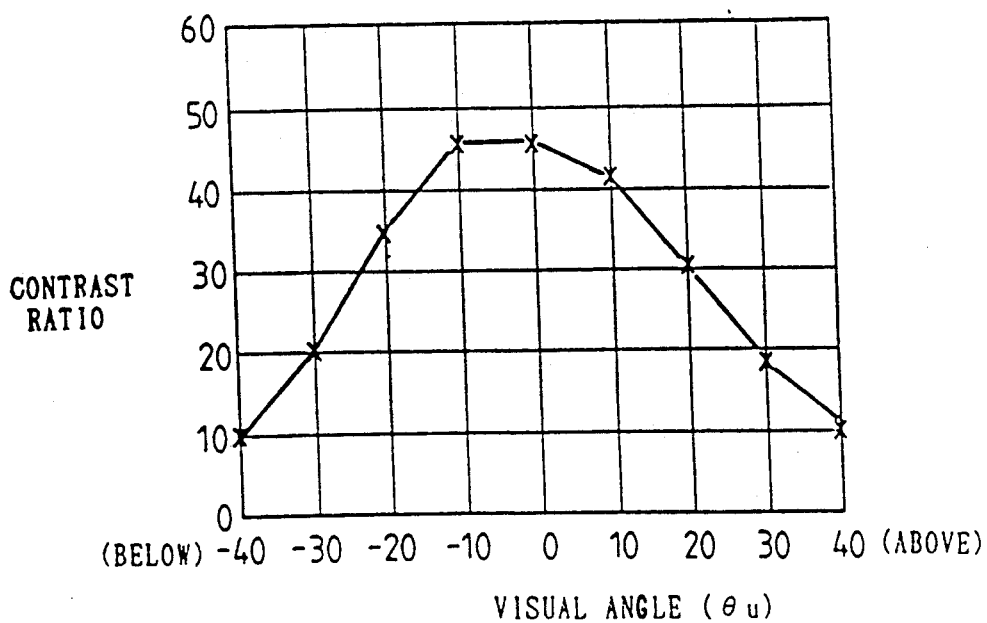
FIG. 8 is a graphic representation of the vertical visual angular dependence of the contrast ratio of said liquid crystal display with its Δnd set a constant of 0.50.

FIG. 8 shows the dependence on vertical visual angles of the contrast ratios of the LCD with a Δnd of 0.50 listed in Table 3. As apparent from this figure, where Δnd=0.50, a relatively large contrast ratio, that is, 45.5:1 is obtained when the visual angle θu is 0 degrees, or the LCD panel is viewed in front, yet the vertical visual angle characteristics are rather inferior as evident from the fact that it is up to −20 degrees in visual angle θu, or when the LCD panel is viewed from below at an angle of 20 degrees, that contrast ratios not less than impaired vertical visual angle characteristics.

Figure 10:
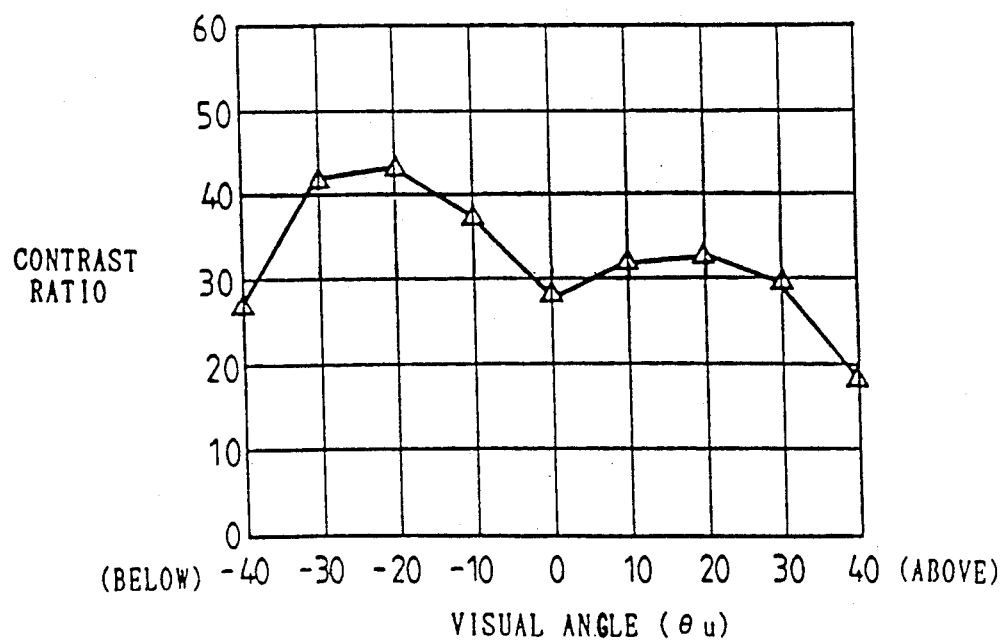
FIG. 10 is a graphic representation of the vertical visual angular dependence of the contrast ratio of said liquid crystal display with its Δnd set at a constant of 0.57.

FIG. 10 shows the dependence on vertical visual angles of the contrast ratios of the LCD with a Δnd of 0.57 listed in Table 10. As apparent from this figure, where Δnd=0.57, contrast ratios fairly stable around 40:1 are obtained as long as the visual angle θu falls within the range −30 degrees to −10 degrees, yet at 0 degrees in θu the contrast ratio decreases to less than 30:1, and within the range +10 to +20 degrees, or when the LCD panel is observed from above at angles of 10 to 20 degrees, the corresponding contrast ratios are rather small, that is, narrowly above 30:1.

Figure 11:
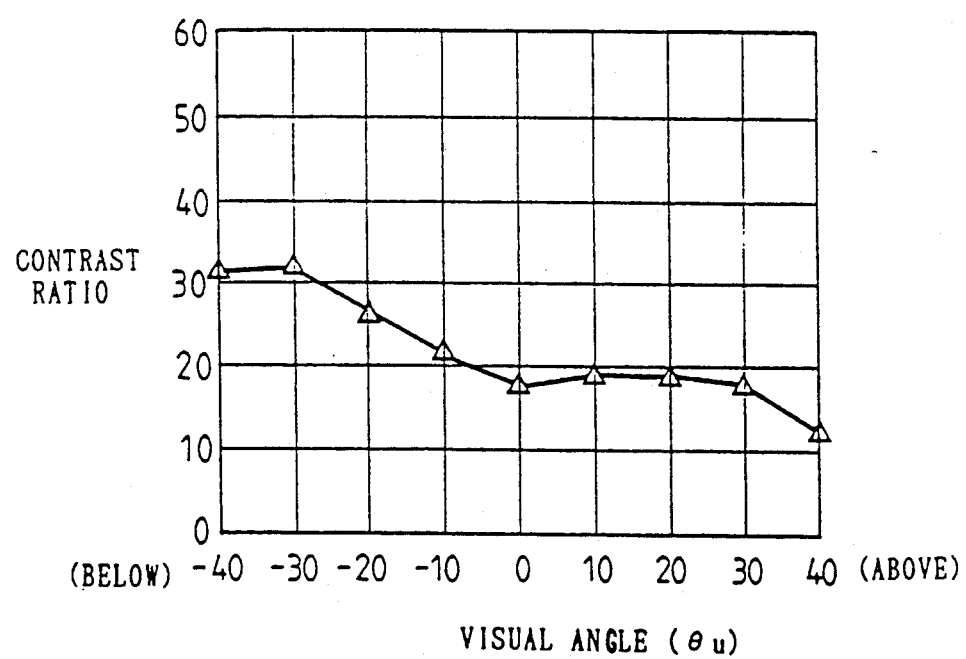
FIG. 11 is a graphic representation of the vertical visual angular dependence of the contrast ratio of said liquid crystal display with its Δnd set at a constant of 0.60.

FIG. 11 shows the dependence on vertical visual angles of the contrast ratios of the LCD with a Δnd of 0.60 listed in Table 12. As apparent from this figure, where Δnd=0.60, contrast ratios narrowly above 30:1 are obtained as long as the visual angle θu falls within the range −40 to −30 degrees, yet at the other angles the corresponding contrast ratios are extremely small.

Figure 12:
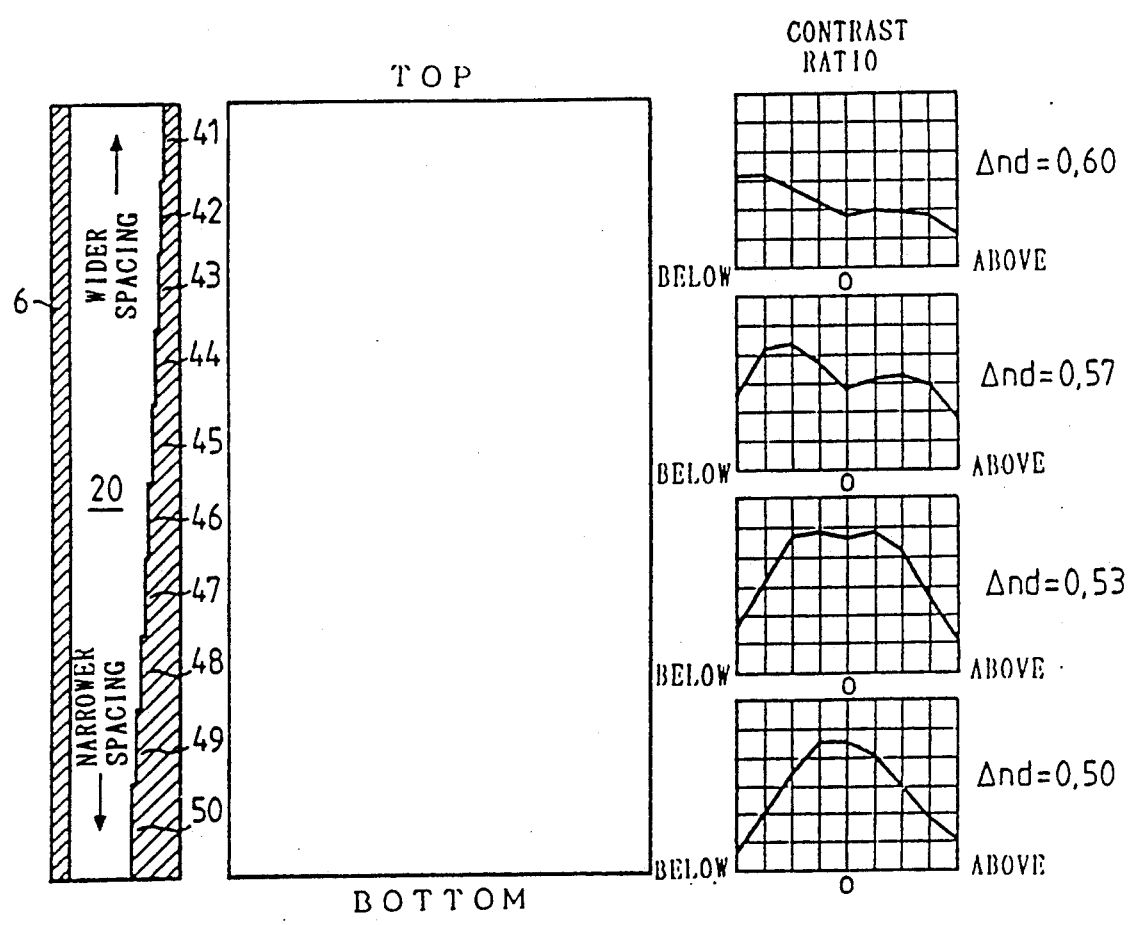
FIG. 12 is a graphic representation of the vertical visual angular dependence of the contrast ratio of the embodiment shown in FIG. 1.

Comparing FIGS. 8, 9, 10, and 11, we find that where there is a great difference in optical path length, the contrast ratios obtained with the LCD panel viewed from below are greater in that degree, and that the contrast ratio tends to increase as the angle of elevation from below the LCD panel decreases. Accordingly, when the space between the front electrode 6 and the rear electrode 4 is gradually narrowed from the upper end toward the lower end of the LCD panel, as in the embodiment shown in FIG. 1, the visual angle characteristics at the respective locations of the LCD panel will be as shown in FIG. 12, so that high and stable contrast ratios are obtained even though the vertical visual angle may be varied. Table 1 and FIG. 7 give contrast ratios estimated from the data listed in Tables 3 to 12 on the assumption that the visual angles at the respective locations of the LCD panel are as mentioned above.

In the embodiment shown in FIG. 1, the optical path length difference Δnd at each of the upper ends of the front electrode 6 and the rear electrode 4 was intentionally set at 0.50 μm, because if Δnd were set at a value less than 0.50 μm, there would arise a problem with the horizontal visual angle characteristics because of peaks in contrast ratio which would take place near a visual angle of 30 degrees.

The optical path length difference Δnd at each of the lower ends of the front electrode 6 and the rear electrode 4 was intentionally set at 0.60 μm, because a Δnd greater than 0.60 μm would result in an extremely low contrast ratio, as listed in Tables 13 and 14.

Also, if the space between the front electrode 6 and the rear electrode 4 is gradually narrowed from the upper end toward the lower end of either electrode, as in the embodiment shown in FIG. 1, a fairly stable chromaticity, or background colors (color levels), will be obtained even though the vertical visual angle may be varied as listed in Table 1.

Figure 13:
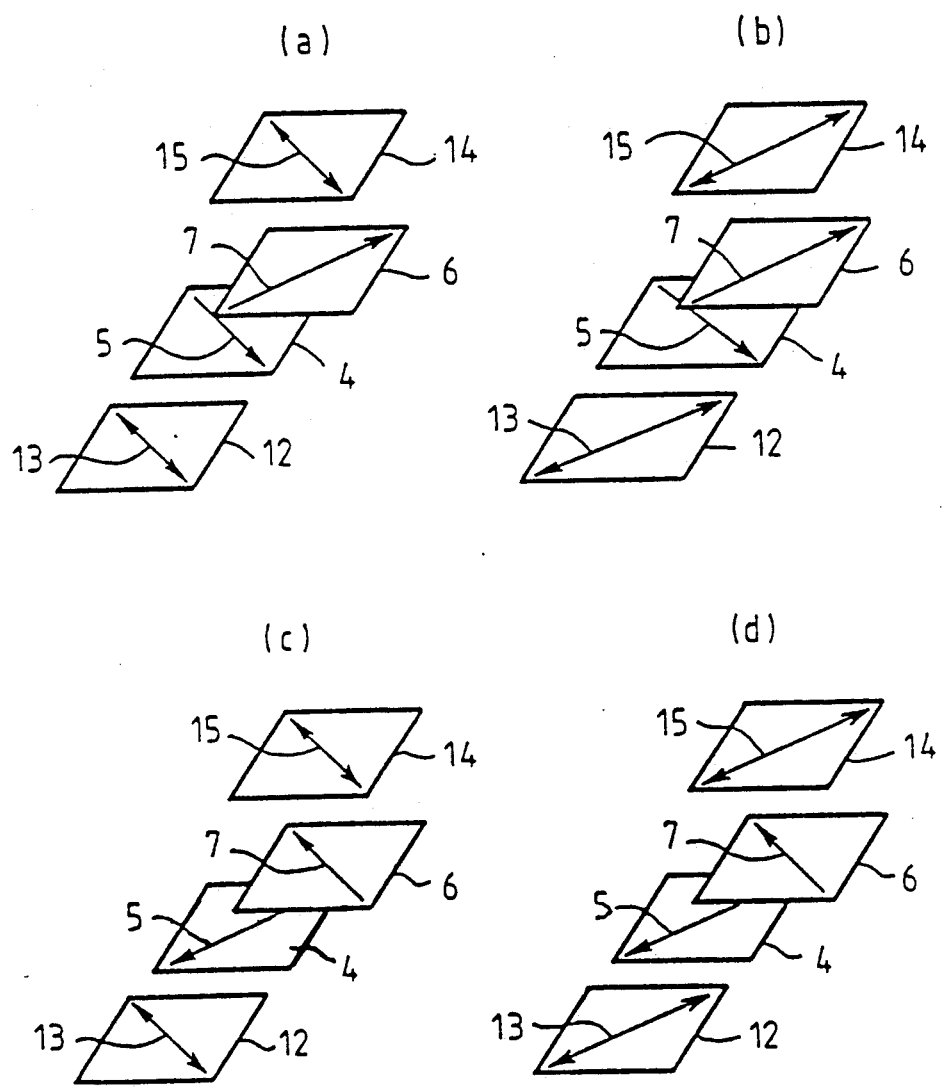
FIG. 13 is an explanatory drawing of some possible combinations of molecular orientations with polarizational axes to which the present invention is applicable.

Moreover, in the above-mentioned embodiment, the front electrode 6 was oriented at an upper-rightward angle of 45 degrees to the horizontal line; the rear electrode 4 was oriented at a lower-rightward angle of 45 degrees to the horizontal line; and the polarizational axes of the front polarizing plate 14 and the rear polarizing plate 12 were oriented at a lower-rightward angle of 45 degrees, as shown in FIG. 13 (a). However, the present invention is not restricted in scope to these conditions, but could also be applied to other twisted nematic liquid crystal displays with the various orientations and polarizational axes shown in FIGS. 13 (b), (c), and (d).

The example in FIG. 13 (b), in which the front electrode 6 is oriented at an upper-rightward angle of 45 degrees to the horizontal line and the rear electrode 4 is oriented at an lower-rightward angle of 45 degrees to the horizontal line, is identical with the above-mentioned embodiment, or the example in FIG. 13 (b), in respect of the orientations of the front electrode 6 and the rear electrode 4, but is different from the example in FIG. 13 (a) in that the polarizational axes 15 and 13 of the front polarizing plate 14 and the rear polarizing plate 12 are at an upper-rightward angle of 45 degrees to the horizontal line. This difference only arises from which polarizing plate shade the light, the front polarizing plate 14 or the rear polarizing plate 12. The twist of the liquid crystal material between the front electrode 6 and the rear electrode 4 is the same, i.e., 90 degrees in the left direction, with both examples in FIG. 13 (a) and (b), and hence it would be evident to those skilled in the art that the vertical visual angle characteristics could be improved by applying liquid crystal displays of the type shown in FIG. 13 (b).

The example in FIG. 13 (c) is identical with the example in FIG. 13 (a) in respect of the directions of the polarizational axes 15 and 13 of the front polarizing plate 14 and the rear polarizing plate 12, but is different from the example in FIG. 12 (a) in that the orientation of the front electrode 6 is at an upper-leftward angle of 45 degrees to the horizontal line, the orientation of the rear electrode 4 is at a lower-leftward angle of 45 degrees to the horizontal line, and therefore the twist of the liquid crystal material between the front electrode 6 and the rear electrode 4 is 90 degrees in the right direction. Yet, the twisting directions of liquid crystal materials in FIG. 13 (a) and (b), observed in front of the LCD panels, are both upward, and hence it would be evident to the manufacturers that the vertical visual angle characteristics could be improved by applying the present invention.

The example in FIG. 13 (d), in which the polarizational axes 15 and 13 of the front polarizing plate 14 and the rear polarizing plate 12 are directed at an upper-rightward angle of 45 degrees, is different from the example in FIG. 13 (c) only in respect of the directions of polarizational axes. This difference only arises from which polarizing plate shades the light, the front polarizing plate 14 or the rear polarizing plate 12, and therefore it would be evident to those skilled in the art that the present invention could be applied to the example of FIG. 13 (d) in the same manner as FIG. 13 (c).

Figure 14:
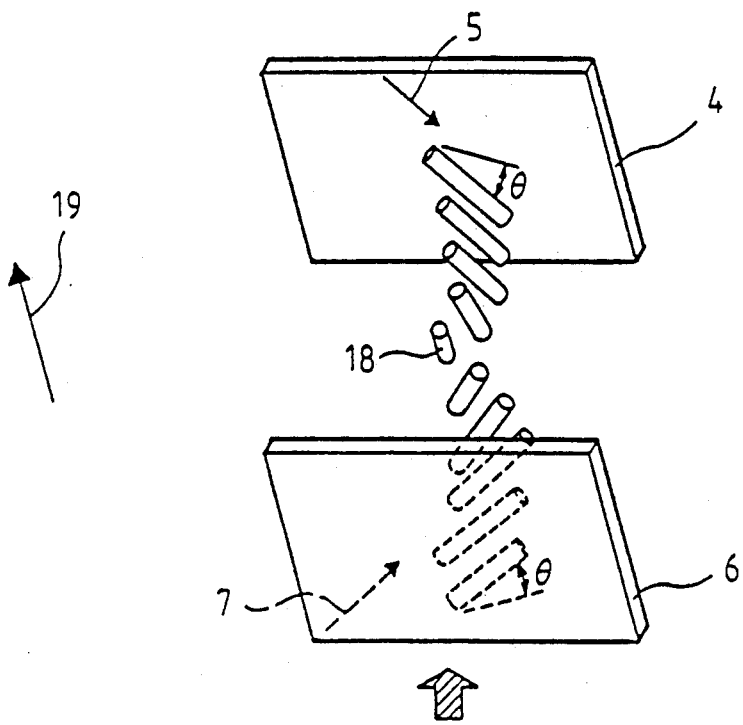
FIG. 14 is an exploded perspective view of the torsion of liquid crystal molecular axes through the molecular orientation treatment shown in FIG. 13 (a) or (b).
Figure 15:
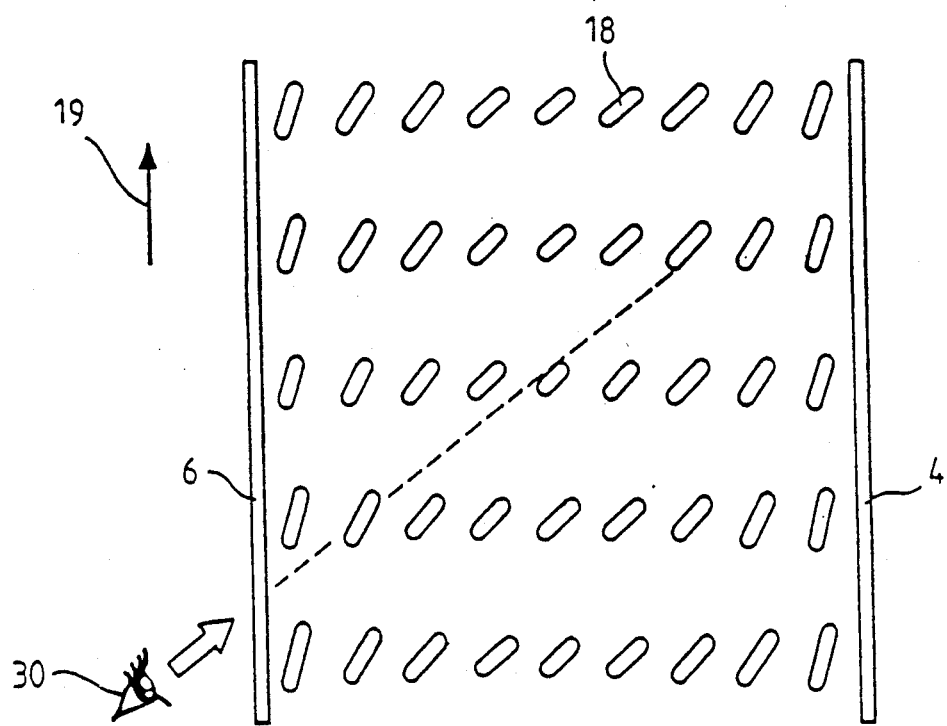
FIG. 15 is a side view of the torsion of liquid crystal molecular axes observed along the front and rear electrodes.

FIGS. 14 and 15 are respectively an exploded perspective view and a side view of the twist of liquid crystal molecular major axes 18 of the twisted nematic liquid crystal displays shown in FIG. 13 (a) and (b). As apparent from these figures, the liquid crystal molecular axes 18 are so tilted that the distance from the front electrode 6 increase as the axes 18 extend upward 19 from the lower position of the LCD panel. Those tilts of the liquid crystal molecular axes 18 remain even after a voltage is applied between the front electrode 6 and the rear electrode 4. Accordingly, with such liquid crystal displays, as shown in FIG. 15, theoretically it would be readily understood that a relatively high contrast ratio could be obtained since the visual angle of an observer 30 becomes equal or very close to the tilt angle of molecular axes 18 when the LCD panel is looked up from below by the observer 30.

Similarly to those of the LCDs shown in FIG. 13 (a) and (b), the liquid crystal molecular major axes of the twisted nematic LCDs shown in FIG. 13 (c) and (d) have been so tilted that the distance from the front electrode should increase as the axes extend upward from the lower position of the display panel.

Accordingly, it could be said to be just in the case where the liquid crystal molecular axes are so tilted that the distance from the front electrode increases as the molecular axes extend upward from the lower position of the display panel that the vertical visual angle characteristics could be improved by narrowing the space between the front electrode and the rear electrode gradually from the top toward the bottom.

Thus, the present invention is applicable not only to those LCDs which have the orientations and polarizational axes shown in FIG. 13 (a), (b), (c), and (d) in particular, but also more widely to other LCDs in which the liquid crystal molecular axes are so tilted that the distance from the front electrode should increase as the molecular axes extend upward from the lower position of the front electrode.

Moreover, by expanding this theory, it is considered that with respect to a liquid crystal display in which front and rear electrodes have been subjected to a certain orientation treatment such that liquid crystal molecular axes are so tilted that the distance from the front electrode increase as the molecular axes extend downward from the upper position of the front electrode, the visual angle characteristics can be improved by increasing in the lower positions, and decreasing in the upper positions, of each of the front electrode and the rear electrode the optical path length difference, given as the product of the thickness of a liquid crystal material between the front electrode and the rear electrode and the double-refraction index of the liquid crystal materials.

In the embodiment shown in FIG. 1 above, the space between the front electrode 6 and the rear electrode 4 has been gradually narrowed in the downward direction by varying the thickness of the rear electrode 4. However, the front electrode 6 may be thickened in the downward direction, as shown in FIG. 16, or both electrodes may be thickened in the downward direction.

Figure 16:
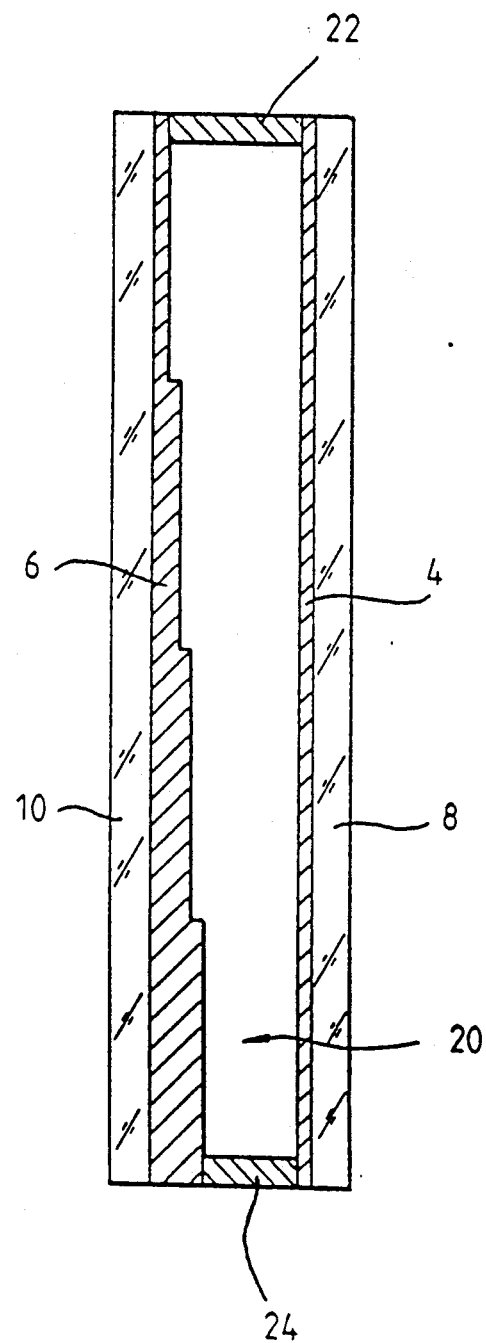
FIG. 16 is a sectional view of another embodiment of the present invention.

In the embodiments shown in FIGS. 1 and 16, the thickness of either the front electrode 6 or the rear electrode 4 is varied so as to widen the space between the front electrode 6 and the rear electrode 4 in the upward direction. However, as shown in FIG. 17, the rear electrode 4 may be tilted to the front electrode 6.

Figure 17:
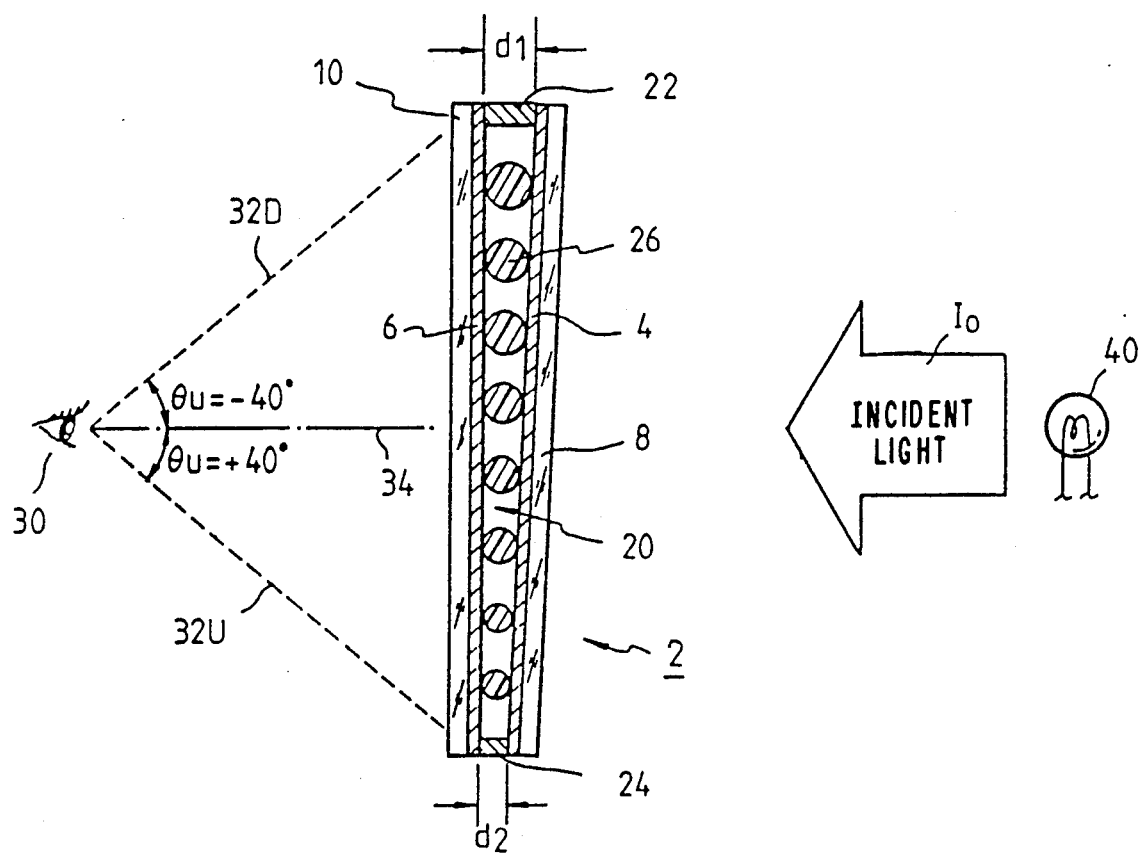
FIG. 17 is a sectional view of a further embodiment of the present invention.

Referring now to FIG. 17, between a front electrode 6 on a front glass substrate 10 to an observer 30 side and a rear electrode 4 on a rear glass substrate 8 to a backlight side there is injected a counterclockwise twisted nematic (TN) liquid crystal material 20 (e.g., Merkmade ZLI3651). Also, between the front electrode 6 and the rear electrode 4 there are distributed spacers 26 composed of plastic beads so as to set the distance between these electrodes at 6.0 $\mu$m at the upper end and 5.0 $\mu$m at the lower end, and also so as to decrease the distance gradually in the downward direction. The spacer 26 at the upper end of each of the glass substrates 8 and 10 is 6.0 $\mu$m in diameter; the spacer 26 at the lower end of each of the glass substrates 8 and 10 are 5.0 $\mu$m in diameter; the spacers 26 between the upper end and the lower end of each of the glass substrates 8 and 10 have diameters gradually decreasing in the downward direction.

Some seals composed of a sealing material as a mixture of a mono-liquid epoxy adhesive and glass fiber are formed on the edges of the front glass substrate 10 and the rear glass substrate 8 by screen printing so as to seal a liquid crystal material 20 between the front electrode 6 and the rear electrode 4. Of such seals, the upper seal 22 at the upper end of each of the front glass substrate 10 and the rear glass substrate 8 is 6.0 $\mu$m in width $d_1$; the lower seal 24 at the lower end of each of the front glass substrate 10 and the rear glass substrate 8 is 5.0 $\mu$m in width $d_2$; there is a side seal (not illustrated) which links the upper seal 22 and the lower seal 24, a side seal 6.0 $\mu$m wide at the upper end and 5.0 $\mu$m wide at the lower end.

In the embodiment shown in FIG. 17, the front glass substrate 10 and the front electrode 6 alike are 30 cm long vertically, and accordingly the rear electrode 8 is tilted at an angle of $1.9 \times 10^{-4}$ degrees to the front electrode 6.

Whereas for the embodiment shown in FIG. 1 the front electrode 6 is parallel with the rear electrode 4, for the embodiment shown in FIG. 17, the front electrode 6 is not parallel with the rear electrode 4 though the tilt of the rear electrode 4 to the front electrode 6 is very small. This advantage is supposed to give almost the same incidence and refraction characteristics as obtained in the case where the two electrodes are parallel, and thus to give the same visual angle characteristics as shown in FIG. 7 and Table 1.

Again, as to the embodiment shown in FIG. 17, the front electrode 6 has been erected and only the rear electrode 4 has been tilted. Yet, it is also permissible to erect the rear electrode 4 and tilt only the front electrode 6, or otherwise to tilt both electrodes 4 and 6 to the vertical line.

In brief, the front electrode 6 has only to tilt relatively to the rear electrode 4 so as to narrow the space between the two electrodes gradually in the downward direction.

It is preferable to set between the front electrode 6 and the rear electrode 4 at an angle falling within the range $5.0 \times 10^{-5}$ to $5.0 \times 10^{-4}$ degree, because practically speaking, the double-refraction indexes $\Delta n$ of common liquid crystal materials will fall within the range 0.07 to 0.20, and therefore it is considered practically reasonable and adequate to set the space between the front electrode and the rear electrode at a $\Delta n d$ of 0.6 $\mu$m in the upper positions and at a $\Delta n d$ of 0.5 $\mu$m in the lower positions, with the vertical length of the display set at 20 to 50 cm. In this case, from a calculation done with respect to cell thickness, we obtain a corresponding difference in cell thickness of 0.5 to 1.5 $\mu$m. Hence, it is preferable to set the angle between the two electrodes at $5.0 \times 10^{-5}$ to $5.0 \times 10^{-4}$ degree.

In the embodiments shown in FIGS. 1, 16, and 17, the space between the front electrode and the rear electrode has been varied to change differences in optical path length. For this purpose, however, it is also possible to seal a liquid crystal material with a relatively large double-refraction factor $\Delta d$ in the upper parts of both electrodes and another liquid crystal material with a relatively small double-refraction factor $\Delta d$ in the lower parts of both electrodes, with the space between the two electrodes kept constant.

Otherwise, both the space between the two electrodes and the double-refraction factors of the liquid crystal materials may be changed.

In brief, we have only to widen the optical path length difference in the upper parts of the front and rear electrodes, and to narrow the optical path length difference in the lower parts of the front and rear electrodes.

Having thus described my invention, what I claim as new and desire to secure by Letters Patent is:

1. In a liquid crystal display having front and rear electrodes, each said electrode having upper and lower positions respectively, said front and rear electrodes subjected to an orientation treatment such that the molecular axes of a liquid crystal material lying between said front electrode and said rear electrode are so tilted that the distance from said front electrode increase as the axes extend upward from said lower position, the improvement comprising:
   the optical path length difference, which is the product of the thickness of said liquid crystal material between said front electrode and said rear electrode and the double-refraction index of said liquid crystal material, being made greater in said upper positions of said front and rear electrodes, and less in said lower positions, and
   wherein said rear electrode is tilted relatively to said front electrode within the range from $5.0 \times 10^{-5}$ degrees to $5.0 \times 10^{-4}$ degrees so that the space between said front electrode and said rear electrode increase from said lower position to said upper position.

2. In a liquid crystal display having front and rear electrodes, each said electrode having upper and lower positions respectively, said front and rear electrodes subjected to an orientation treatment such that the molecular axes of a liquid crystal material lying between said front electrode and said rear electrode are so tilted that the distance from said front electrode increase as the axes extend upward from said lower position, the improvement comprising:
   the optical path length difference, which is the product of the thickness of said liquid crystal material between said front electrode and said rear electrode and the double-refraction index of said liquid crystal material, being made greater in said upper positions of said front and rear electrodes, and less in said lower positions, and
   wherein the thickness of at least one of said front electrode and said rear electrode is made thinner in the upper positions, and made thicker in the lower positions to form an angle between said rear electrode and said front electrode within the range from $5.0 \times 10^{-5}$ degrees to $5.0 \times 10^{-4}$ degrees.

3. A liquid crystal display as defined in claim 1, wherein the following relations is held with respect to U and D:

$$0.5 \; \mu m \leq U \leq 0.6 \; \mu m$$

$$0.5 \; \mu m \leq D \leq 0.6 \; \mu m$$

$$D < U$$

where U denotes an optical path length difference, which is the product of the thickness of said liquid crystal material between said front electrode and said rear electrode in a first position along the vertical direction of said liquid crystal display and the double-refraction index of said liquid crystal material; D denotes another optical path length difference, which is the product of the thickness of said liquid crystal material between said front electrode and said rear electrode in a second position below said first position and the double-refraction index of said liquid crystal material.

4. In a liquid crystal display having front and rear electrodes, each said electrode having upper and lower positions respectively, said front and rear electrodes subjected to an orientation treatment such that the molecular axes of a liquid crystal material lying between said front electrode and said rear electrode are so tilted that the distance from said front electrode increase as the axes extend downward from said upper position, the improvement comprising:
   the optical path length difference, which is the product of the thickness of said liquid crystal material between said front electrode and said rear electrode and the double-refraction index of said liquid crystal material, is made greater in said lower positions of said front and rear electrodes, and less in said upper positions, and
   wherein said rear electrode is tilted relatively to said front electrode within the range from $5.0 \times 10^{-5}$ degrees to $5.0 \times 10^{-4}$ degrees so that the space between said front electrode and said rear electrode increase from said upper position to said lower position.

5. A liquid crystal display comprising:
   a nematic liquid crystal material disposed between two plates;
   said plates being oriented to cause said liquid crystal material to define a twisted structure in the direction perpendicular to said plates;
   the direction of the orientation of said plates being selected so that the usual direction of viewing is identical with the direction in which said twisted structure is lost when a voltage is applied across said liquid crystal material; and
   an optical path difference between said plates becoming larger from the direction away from said usual direction of viewing to said usual direction of viewing
   wherein one of said plates is inclined to the other of said plates in the range from $5.0 \times 10^{-5}$ degrees to $5.0 \times 10^{-4}$ degrees.

6. The liquid crystal display as defined in claim 5, wherein the largest optical path difference between said plates is 0.6 micrometer and the smallest optical path difference between said plates is 0.5 micrometers.

7. A method for reducing the variation in contrast ratio of a liquid crystal display as a function of the visual angle to the liquid crystal display comprising the steps of:
   setting the optical path length difference greater in the upper positions of the liquid crystal display and setting the optical path length difference smaller in the lower positions of the liquid crystal display wherein said optical path length difference is given as the product of the thickness of a liquid crystal material interposed between a front electrode and a rear electrode and the double refraction index of the liquid crystal material,
   said step of setting the optical path length difference includes the step of positioning said front and rear electrodes to form an angle therebetween within the range from $5.0 \times 10^{-5}$ degrees to $5.0 \times 10^{-4}$ degrees.

* * * * *